US010887092B2

(12) United States Patent
Baron et al.

(10) Patent No.: US 10,887,092 B2
(45) Date of Patent: Jan. 5, 2021

(54) ANONYMOUS ALLOCATION AND MAJORITY VOTING IN A COMPROMISED ENVIRONMENT

(71) Applicant: HRL Laboratories, LLC, Malibu, CA (US)

(72) Inventors: Joshua W. Baron, Los Angeles, CA (US); Karim El Defrawy, Santa Monica, CA (US); Aleksey Nogin, Fresno, CA (US); Chongwon Cho, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/433,928

(22) Filed: Jun. 6, 2019

(65) Prior Publication Data

US 2020/0052890 A1    Feb. 13, 2020

Related U.S. Application Data

(60) Provisional application No. 62/716,680, filed on Aug. 9, 2018.

(51) Int. Cl.
*H04L 9/08* (2006.01)
*G06F 9/50* (2006.01)
*H04L 29/06* (2006.01)

(52) U.S. Cl.
CPC ............ *H04L 9/085* (2013.01); *G06F 9/5033* (2013.01); *H04L 63/0421* (2013.01)

(58) Field of Classification Search
None
See application file for complete search history.

(56) References Cited

U.S. PATENT DOCUMENTS 8,700,906 B2 *  4/2014  Kamara ............... G06F 9/5072
                                                  713/180
9,449,177 B1 *  9/2016  El Defrawy ........... H04L 9/085
(Continued)

FOREIGN PATENT DOCUMENTS

WO    WO2017190794    11/2017

OTHER PUBLICATIONS

Peter Bogetoft, et al., Secure multiparty computation goes live. In Roger Dingledine and Philippe Golle, editors, Financial 16 Cryptography and Data Security, vol. 5628 of Lecture Notes in Computer Science, pp. 325-343. Springer Berlin Heidelberg, 2009.
(Continued)

*Primary Examiner* — Benjamin E Lanier
(74) *Attorney, Agent, or Firm* — Tope-McKay & Associates

(57) ABSTRACT

Described is a system for anonymous job allocation and majority voting in a cloud computing environment. The system broadcasts a job to physical nodes, each of the physical nodes having a control operations plane (COP) node and one or more service nodes associated with the COP node. A set of redundant job assignments is distributed to individual COP nodes pursuant to a private job assignment schedule, such that each individual COP node is only aware of its own assignment and corresponding job. The service nodes execute the job assigned to the COP nodes such that the service nodes each complete a task associated with the job and forward an individual result to their associated COP node. A privacy-preserving result checking protocol is performed amongst the COP nodes such that secret shares of a majority result are obtained and the majority result is provided to a client.

17 Claims, 4 Drawing Sheets

(56) References Cited

U.S. PATENT DOCUMENTS

| | | | | |
|---|---|---|---|---|
| 9,846,596 | B1* | 12/2017 | Nogin | G06F 9/5027 |
| 2018/0241747 | A1* | 8/2018 | Tanaka | H04L 9/085 |

OTHER PUBLICATIONS

Dan Bogdanov, Sven Laur, and Jan Willemson. Sharemind: A framework for fast privacy-preserving computations. In Sushil Jajodia and Javier Lopez, editors, Computer Security—ESORICS 2008, vol. 5283 of Lecture Notes in Computer Science, pp. 192-206. Springer Berlin Heidelberg, 2008.

J. Baron, K. El Defrawy, A Nogin, and R. Ostrovsky. An architecture for a resilient cloud computing infrastructure. In Technologies for Homeland Security (HST), 2013 IEEE International Conference on, pp. 390-395, 2013.

Ran Canetti. Universally composable security: A new paradigm for cryptographic protocols. In Proceedings of the 42Nd IEEE Symposium on Foundations of Computer Science, FOCS '01, pp. 136-145, 2001.

Christian Cachin, Klaus Kursawe, Anna Lysyanskaya, and Reto Strobl. Asynchronous verifiable secret sharing and proactive cryptosystems. In Proceedings of the 9th ACM Conference on Computer and Communications Security, CCS '02, pp. 88-97, New York, NY, USA, 2002.

Ivan Damg'ard and Jesper Buus Nielsen. Scalable and unconditionally secure multiparty computation. In Alfred Menezes, editor, Advances in Cryptology—CRYPTO 2007, vol. 4622 of Lecture Notes in Computer Science, pp. 572-590. Springer Berlin Heidelberg, 2007.

Ivan Damgrd, Marcel Keller, Enrique Larraia, Valerio Pastro, Peter Scholl, and NigelP. Smart. Practical covertly secure mpc for dishonest majority or: Breaking the spdz limits. In Jason Crampton, Sushil Jajodia, and Keith Mayes, editors, Computer Security ESORICS 2013, vol. 8134 of Lecture Notes in Computer Science, pp. 1-18. Springer Berlin Heidelberg, 2013.

Ivan Damgrd, Valerio Pastro, Nigel Smart, and Sarah Zakarias. Multiparty computation from somewhat homomorphic encryption. In Reihaneh Safavi-Naini and Ran Canetti, editors, Advances in Cryptology CRYPTO 2012, vol. 7417 of Lecture Notes in Computer Science, pp. 643-662. Springer Berlin Heidelberg, 2012.

Amir Herzberg, Stanislaw Jarecki, Hugo Krawczyk, and Moti Yung. Proactive secret sharing or: How to cope with perpetual leakage. In CRYPTO, pp. 339-352, 1995.

A.D. Keromytis, R. Geambasu, S. Sethumadhavan, S.J. Stolfo, Junfeng Yang, A. Benameur, M. Dacier, M. Elder, D. Kienzle, and A. Stavrou. The MEERKATS cloud security architecture. In ICDCSW, pp. 446-450, 2012.

Rafail Ostrovsky and Moti Yung. How to withstand mobile virus attacks (extended abstract). In PODC, pp. 51-59, 1991.

Adi Shamir. How to share a secret. Commun. ACM, 22(11): pp. 612-613, 1979.

Tomas Toft. Primitives and applications for multi-party computation. PhD Thesis. University of Aarhus, Sections 8.1-8.1.4, pp. 49-53, 2007.

Lidong Zhou, Fred B. Schneider, and Robbert Van Renesse. Coca: A secure distributed online certification authority. ACM Trans. Comput. Syst., 20(4): pp. 329-368, 2002.

Notification of Transmittal of International Search Report and the Written Opinion of the International Searching Authority for PCT/US2019/035854; dated Oct. 1, 2019.

International Search Report of the International Searching Authority for PCT/US2019/035854; dated Oct. 1, 2019.

Written Opinion of the International Searching Authority for PCT/US2019/035854; dated Oct. 1, 2019.

Joshua Baron et al., 'An architecture for a resilient cloud computing Infrastructure', 2013 IEEE International Conference on Technologies for Homeland Security (HST), May 19, 2016.

Amos Beimel et al., 'Non-Interactive Secure Multiparty Computation', Advances in Cryptology—CRYPTO 2014, Part II, LNCS 8617, pp. 387-404, Aug. 21, 2014.

Christoph Lucas et al., 'Hybrid-Secure MPC: Trading Information-Theoretic Robustness for Computational Privacy', Proceeding of the 29th ACM SIGACT-SIGOPS symposium on Principles of distributed computing, pp. 219-228, Jul. 28, 2010.

\* cited by examiner

ANONYMOUS ALLOCATION AND MAJORITY VOTING IN A COMPROMISED ENVIRONMENT

GOVERNMENT LICENSE RIGHTS

This invention was made with government support under U.S. Government Contract Number HSHQDC-13-C-B0026. The government may have certain rights in the invention.

CROSS-REFERENCE TO RELATED APPLICATIONS

This is a Non-Provisional Application of U.S. Provisional Application No. 62/716,680, filed in the United States on Aug. 9, 2018, entitled, "Anonymous Allocation and Majority Voting in a Compromised Environment," the entirety of which is incorporated herein by reference.

BACKGROUND OF INVENTION

(1) Field of Invention

The present invention relates to a security system and, more particularly, to a security system for anonymous allocation of jobs to node servers and majority voting on a job result using cloud-control operation plane (COP) protocols.

(2) Description of Related Art

Secure multi-party computation (MPC), or privacy-preserving computation, is a subfield of cryptography with the goal of creating methods for parties (or nodes) to jointly compute a function over their inputs while keeping those inputs private. Unlike traditional cryptographic tasks, where the adversary is outside the system of participants (an eavesdropper on the sender and receiver), the adversary in this model controls actual participants.

The cloud control plane is a combination of protocols, tools, techniques, and mechanisms responsible for controlling the execution of a job in the cloud, which can include scheduling, allocation, status reporting, and other control functionalities. Using proactive secret sharing and MPC to secure the control plane in a cloud was first proposed by Baron et al. (see Literature Reference No. 3 in the List of Incorporated Literature References), but without detailed protocols for exact operation, implementation, nor performance assessment, especially for the malicious adversary setting.

Other relevant cloud computing security work is that of the MEERKATS cloud security architecture (see Literature Reference No. 10), which also uses proactive secret sharing but only to enable migration of data by proactively sharing the data encryption key. In order to process the data, each cloud node must decrypt it, and then store an unencrypted version locally.

The most relevant MPC protocol is that of Literature Reference No. 6 (DN-MPC). Proactive security was introduced in Literature Reference No. 11, proactive secret sharing was refined in Literature Reference No. 9 to provide cryptographic security when less than half the nodes are corrupted while Literature Reference No. 5 addressed the asynchronous case. Examples of practical and deployed implementations of generic MPC include Literature Reference No. 1, which utilized three servers to implement a large scale auction for sugar beets. Other recent examples include Literature Reference Nos. 2, 7, and 8. There are a small number of publicly-available implementations of proactively-secure computation; one is COCA (see Literature Reference No. 14), which developed a fault-tolerant online certification authority that has been tested in both in a local area network and on the Internet.

While there have been proactive secret sharing and MPC protocols to secure the control plane in a cloud, none of the existing techniques have taken sufficient measures to hide the identity of servers that are assigned jobs. Thus, a continuing need exists for a security system that allows a collection of servers that receives jobs from clients to assign each job to one or more node servers in such a way that no server knows which of the other servers were assigned that job, making it more difficult for an adversary to selectively target servers that are assigned jobs.

SUMMARY OF INVENTION

The present invention relates to a security system, and more particularly, to a security system for anonymous allocation of jobs to node servers and majority voting on a job result using cloud-control operation plane (COP) protocols. The system comprises one or more processors and a non-transitory computer-readable medium having executable instructions encoded thereon such that when executed, the one or more processors perform multiple operations. The system broadcasts an executable job to a plurality of physical nodes, each of the physical nodes having a single control operations plane (COP) node and one or more service nodes associated with the COP node. A private job assignment schedule is created jointly amongst a plurality of COP nodes. A set of redundant job assignments with value m is distributed to individual COP nodes pursuant to the private job assignment schedule, such that each individual COP node is only aware of its own assignment and corresponding job, wherein at least m COP nodes are assigned to the job with a probability greater than a predetermined threshold. The service nodes execute the job assigned to the at least m COP nodes such that the service nodes each complete a task associated with the job and forward an individual result to their associated COP node. A privacy-preserving result checking protocol is performed jointly amongst the at least m COP nodes, such that the at least m COP nodes obtain secret shares of a majority result, wherein the majority result is the individual result obtained by a determined majority of the service nodes. The majority result is provided to a client.

In another aspect, a value representing the determined majority of the service nodes is hidden from any corrupted nodes unless a corrupted node is assigned to the job.

In another aspect, in performing the result checking protocol, a voting algorithm for determining the majority value is implemented, wherein the voting algorithm comprises a voting phase and a majority decision phase.

In another aspect, during the voting phase, each node assigned to the job secretly shares [hash($y_i$)]; each node not assigned the job shares nothing; each node computes [$v_i^j$]= [$b_i^j$]·[hash($y_i$)]; each node computes [$c^j$]=$\Sigma_{i=1}^{n}$[$v_i^j$]; and each $P_i$ broadcasts [$c^j$] for all j.

In another aspect, during the majority decision phase, each node recovers $c^j$ for all j; each node computes c which appears most frequently among $c^j$ values; each node sends c to the client; each node assigned to the job sends $y_i$ to the client; and each node not assigned to the job sends nothing to the client.

In another aspect, any $y_i$ that satisfies hash($y_i$)=c is provided as the majority result to the client.

In another aspect, the client is a vehicle, and the majority result is an optimal route to a destination for the vehicle.

In another aspect, the system causes the vehicle to maneuver along the optimal route.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
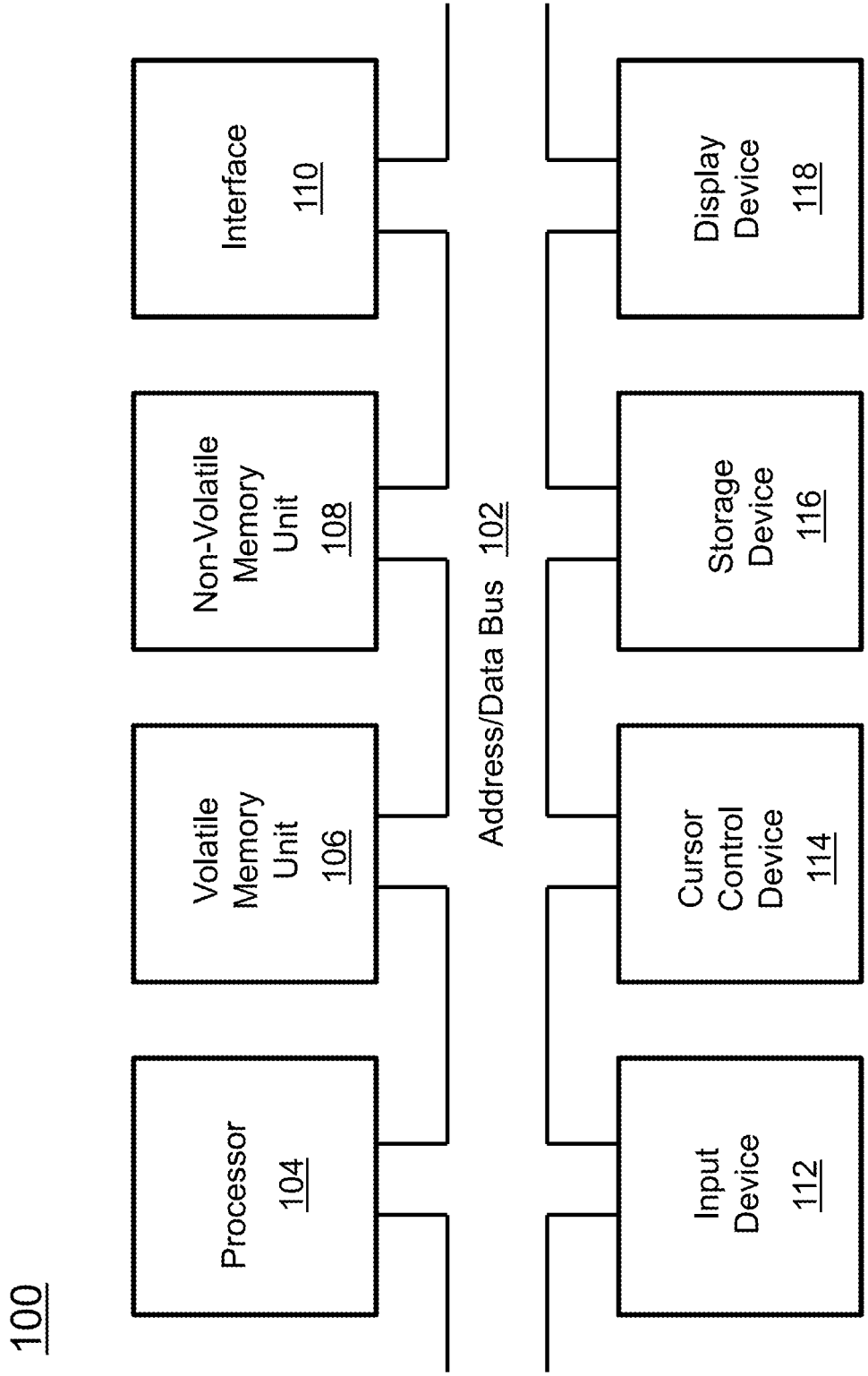
FIG. 1 is a block diagram depicting the components of a security system according to some embodiments of the present disclosure.

The present invention relates to a security system, and more particularly, to a security system for anonymous allocation of jobs to node servers and majority voting on a job result using cloud-control operation plane (COP) protocols. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The Following References are Cited and Incorporated Throughout this application. For clarity and convenience, the references are listed herein as a central resource for the reader. The following references are hereby incorporated by reference as though fully set forth herein. The references are cited in the application by referring to the corresponding literature reference number, as follows:

1. Peter Bogetoft, DanLund Christensen, Ivan Damgrd, Martin Geisler, Thomas Jakobsen, Mikkel Krigaard, JanusDam Nielsen, JesperBuus Nielsen, Kurt Nielsen, Jakob Pagter, Michael Schwartzbach, and Tomas Toft. Secure multiparty computation goes live. In Roger Dingledine and Philippe Golle, editors, Financial 16 Cryptography and Data Security, volume 5628 of Lecture Notes in Computer Science, pages 325-343. Springer Berlin Heidelberg, 2009.
2. Dan Bogdanov, Sven Laur, and Jan Willemson. Sharemind: A framework for fast privacy-preserving computations. In Sushil Jajodia and Javier Lopez, editors, Computer Security—ESORICS 2008, volume 5283 of Lecture Notes in Computer Science, pages 192-206. Springer Berlin Heidelberg, 2008.
3. J. Baron, K. El Defrawy, A Nogin, and R. Ostrovsky. An architecture for a resilient cloud computing infrastructure. In Technologies for Homeland Security (HST), 2013 IEEE International Conference on, pages 390-395, 2013.
4. Ran Canetti. Universally composable security: A new paradigm for cryptographic protocols. In Proceedings of the 42Nd IEEE Symposium on Foundations of Computer Science, FOCS '01, page 136, 2001.
5. Christian Cachin, Klaus Kursawe, Anna Lysyanskaya, and Reto Strobl. Asynchronous verifiable secret sharing and proactive cryptosystems. In Proceedings of the 9th ACM Conference on Computer and Communications Security, CCS '02, pages 88-97, New York, N.Y., USA, 2002.
6. Ivan Damg® ard and Jesper Buus Nielsen. Scalable and unconditionally secure multiparty computation. In Alfred Menezes, editor, Advances in Cryptology—CRYPTO 2007, volume 4622 of Lecture Notes in Computer Science, pages 572-590. Springer Berlin Heidelberg, 2007.
7. Ivan Damgrd, Marcel Keller, Enrique Larraia, Valerio Pastro, Peter Scholl, and Nigel P. Smart. Practical covertly secure mpc for dishonest majority or: Breaking the spdz limits. In Jason Crampton, Sushil Jajodia, and Keith Mayes, editors, Computer Security ESORICS 2013, volume 8134 of Lecture Notes in Computer Science, pages 1-18. Springer Berlin Heidelberg, 2013.
8. Ivan Damgrd, Valerio Pastro, Nigel Smart, and Sarah Zakarias. Multiparty computation from somewhat homomorphic encryption. In Reihaneh Safavi-Naini and Ran Canetti, editors, Advances in Cryptology CRYPTO 2012, volume 7417 of Lecture Notes in Computer Science, pages 643-662. Springer Berlin Heidelberg, 2012.
9. Amir Herzberg, Stanislaw Jarecki, Hugo Krawczyk, and Moti Yung. Proactive secret sharing or: How to cope with perpetual leakage. In CRYPTO, pages 339-352, 1995.
10. A. D. Keromytis, R. Geambasu, S. Sethumadhavan, S. J. Stolfo, Junfeng Yang, A. Benameur, M. Dacier, M. Elder, D. Kienzle, and A. Stavrou. The MEERKATS cloud security architecture. In ICDCSW, pages 446-450, 2012.
11. Rafail Ostrovsky and Moti Yung. How to withstand mobile virus attacks (extended abstract). In PODC, pages 51-59, 1991.
12. Adi Shamir. How to share a secret. Commun. ACM, 22(11):612-613, 1979.
13. Tomas Toft. Primitives and applications for multi-party computation. PhD Thesis. University of Aarhus, Sections 8.1-8.1.4, pages 49-53, 2007.
14. Lidong Zhou, Fred B. Schneider, and Robbert Van Renesse. Coca: A secure distributed online certification authority. ACM Trans. Comput. Syst., 20(4):329-368, 2002.

(2) Principal Aspects

Various embodiments of the invention include three "principal" aspects. The first is a security system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
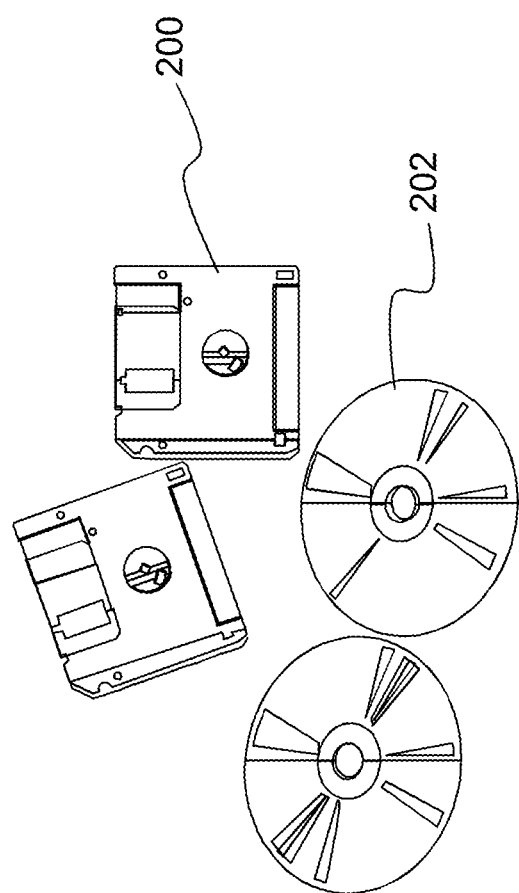
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described herein is security system implementing a collection of network protocols (expressed in a form of arithmetic circuits) for a collection of servers to perform randomized, redundant job allocation and majority voting on the job result with a multi-party computation (MPC) protocol. To provide context, imagine a distributed system (e.g., cloud or a grid computing environment) that is under potential attack from a powerful adversary that can potentially subvert any specific node in the system, if they knew which node they need to attack. Further, it is assumed that some subset of the nodes could already be under the attacker control (without that necessarily being evident in any way). To protect execution of a sensitive job from the attacker, it is beneficial to make sure that the job is executed on a node that is picked at random, in such a way that only the assignee node finds out that it has been assigned, while no other nodes (including the ones under attacker control) can either find out or influence the allocation. Optionally, to address the possibility that the job would be assigned to a compromised node just through bad luck, the system according to embodiments of the present disclosure makes several redundant allocations and compares the results.

In this work it is assumed that, after allocation and prior to result delivery, the result is computed by an individual node, while the allocation and result delivery are performed by a secure multi-party computation protocol. Previous protocols for job allocation have not taken sufficient measures to hide the identity of servers that are assigned jobs. The protocols described in this disclosure allow a collection of servers that receives jobs from clients to assign each job to one or more node servers in such a way that no server knows which of the other servers were assigned that job. This makes it more difficult for an adversary to selectively target servers that are assigned jobs.

The system described herein is an improvement over existing work in multiple ways. First, proactive secret sharing and MPC is used to design and implement a lightweight, resilient, and anonymous supervisory layer for cloud computing, which is the first application of proactively-secure computation to that domain. Second, unique cryptographic protocols are provided that efficiently perform required operations in the supervisory layer and minimize usage of expensive interactive MPC steps. Third, optimizations were developed at different levels to speed-up and scale MPC. Fourth, the entire Cloud-Control Operations Plane (COP) supervisory layer is implemented with security guarantees against both honest-but-curious and malicious adversaries. Finally, experiments were performed with a large number of nodes (up to 128), and performance evaluation of the entire system is reported with the large number of nodes (typical prior art implementations and deployments of MPC consider less than ten nodes).

(3.1) Architecture and Data Flow

The following is a description of the data flow of a system for which the protocols according to embodiments of the present disclosure are intended. The data flow can be implemented on a cloud architecture, a non-limiting example of such a cloud architecture is that as described in U.S. Pat. No. 9,846,596, which is hereby incorporated by reference as though fully set forth herein. Also described is the cryptographic state-of-the-art of the MPC used in the invention described herein.

Figure 3:
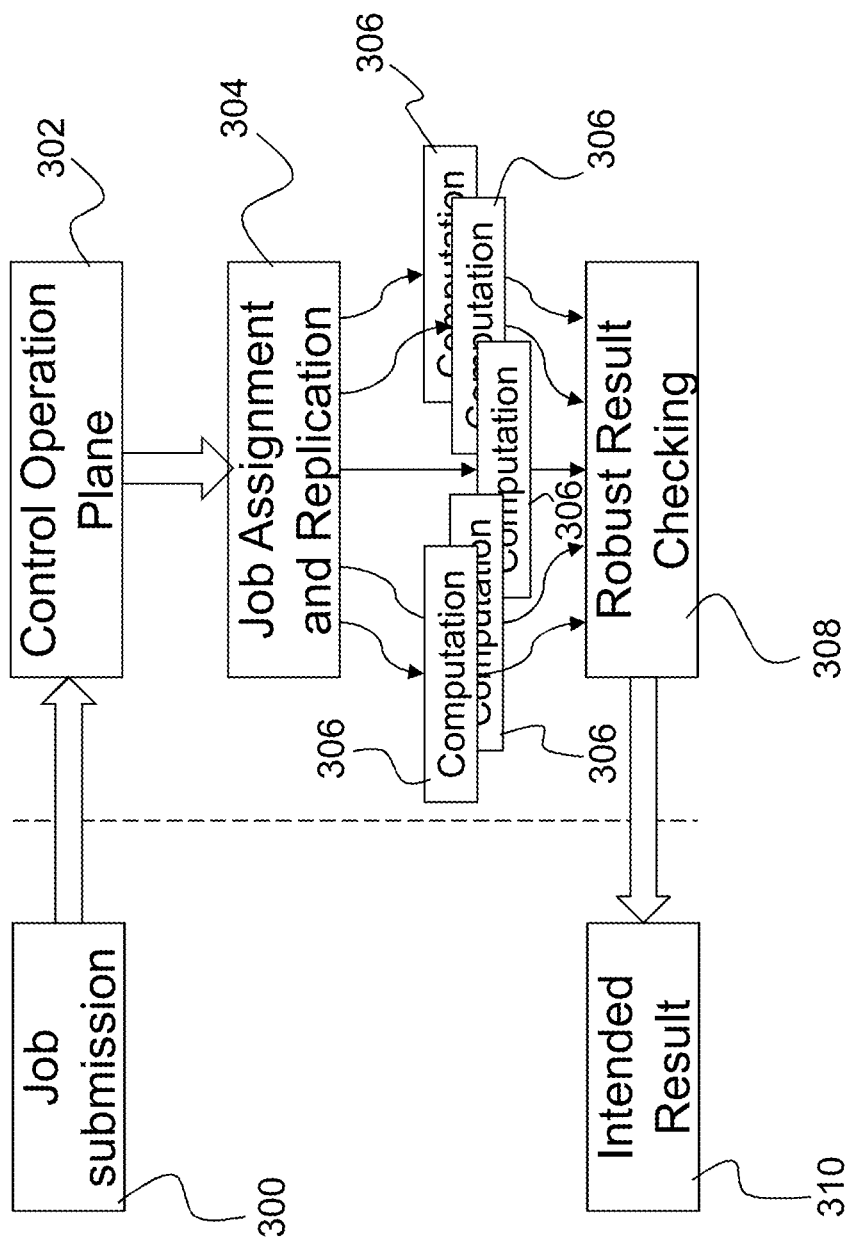
FIG. 3 is a diagram illustrating data flow for a control operation plane (COP)-protected cloud according to some embodiments of the present disclosure.

An overall data flow of a cloud architecture is depicted in FIG. 3. First, a user has a job for the cloud to execute. The user sends the job to the cloud (element 300) by broadcasting it to all physical nodes (e.g., computer) that have a COP node (e.g., software component). For instance, several individual software components can reside on a single physical node. A physical node could contain the COP software ("COP node"), virtual machine for executing compute jobs, etc. A "COP layer" is a combination of all the COP nodes, the protocols they jointly execute, etc.

The COP nodes (element 302) (even if some are compromised) jointly create a private job assignment and replication schedule (element 304). The COP nodes jointly distribute job assignments to individual COP nodes, which assign mission-related jobs to service nodes that reside at their host. For the purposes of this disclosure, a host is equivalent to a physical node, and service nodes are software modules that perform the job-related functions (as opposed to job control related functions that are performed by the COP layer (see Literature Reference No. 3). No COP node (and therefore no service node that is not on the same host) knows whether any other COP node has an assignment or not, or the content of any other assignment. To provide resiliency against short-term corruption, the jobs are redundantly assigned by the COP nodes (according to a tunable parameter that can change dynamically according to COP attack risk estimate).

Jobs are actually executed by the service nodes; these nodes are isolated from each other and can only communicate with each other or with the user through the COP or one of the auxiliary COP services. When a set of nodes performing the same job completes its task (i.e. computation (element 306), they forward their output to their corresponding COP node. The COP nodes with these same job outputs jointly perform a privacy-preserving robust result checking protocol (element 308) that does not reveal identities or results, and collectively the COP obtains secret shares of the result obtained by the majority of service nodes. COP nodes participate in protocols and obtain shares. In some cases, it is all of the COP nodes that participate in all of the protocols, and all obtain shares. However, one can also decide to set up a system to have spare nodes that do not participate in anything. In addition, the protocol may also choose to exclude certain misbehaving nodes from participation. The COP then uses these shares for the next sequence of anonymous mission-related jobs. At the final stage, the COP takes the final result-checked output (element 310) and forwards it to the user.

At any point during this process, an individual node knows only the information needed to run its own task; any global information used collectively by the COP nodes (such as job assignment information and intermediate job data) is unknown to individual COP nodes. This is to ensure that when an attacker controls any nodes on the same physical node, all the attacker can do is obtain information about that particular physical node and not about any other cloud data (e.g., how many nodes and which nodes are working on the same job). Since any COP node will always be reset to a pristine state at regular intervals (these intervals are also a tunable parameter), even if COP nodes are continuously corrupted, COP operation will continue unhindered. The system described herein consists of the protocols for securely and efficiently implementing the "Job Submission", "Job Assignment and Replication," and "Robust Result Checking" blocks of the above architecture.

(3.2) Cryptography Preliminaries

The engine underlying the invention is a well-known technique—secure multi-party computation (MPC). In this section, some details on the specific form of MPC utilized in the invention are provided. This section provides background information on previously known techniques. First, a review of linear secret sharing and generic secure multi-party computation (MPC) protocols is provided. Then, a description of message authentication and coin tossing using MPC is provided. These building blocks and protocols are used to build Cloud-COP protocols for job submission, job allocation, and result delivery. In this disclosure, k denotes the security parameter.

(3.2.1) Secret Sharing

Informally, a t-out-of-n Secret Sharing (SS) scheme (see Literature Reference No. 12) among n parties is a scheme where a dealer (D) who has a secret s distributes shares, denoted by [s], to all parties such that any t or more parties can reconstruct s from its shares by performing polynomial interpolation. The main security guarantee is that no group of less than t parties can learn any information about s. In Shamir's t-out-of-n linear SS scheme (see Literature Reference No. 12), to share a secret s, the dealer D chooses a random univariate polynomial $p(x) \in \mathbb{F}[x]$ (i.e., a random polynomial of variable x with coefficients in some prime order field $\mathbb{F} = \mathbb{Z}_q$ for some prime q such that $q \in (2^{k-1}, 2^k)$ of degree t with its free term corresponding to the secret s, i.e., $p(0)=s$). Dealer D, then evaluates the polynomial on n points $x_i \neq 0 \in \mathbb{F}$ for $i \in \{1, \ldots, n\}$ such that $f(x_i)$ is the share of s handed to $i^{th}$ party. In the following, call secret share of s, denoted by [s], as t-sharing of s if p(x) is of degree t. Use $\langle s \rangle$ to denote 2t-sharing of secret s where p(x) is of degree 2t.

(3.2.2) Secure Multiparty Computation (MPC)

One of the main cryptographic building blocks for Cloud-COP's operation is an MPC protocol which enables n parties to securely evaluate an arithmetic circuit describing the computation to be performed (i.e., representing the computation as addition and multiplication gates). In particular, the present disclosure builds on the MPC protocol proposed by Damgard and Nielsen in Literature Reference No. 6 (for short, DN-MPC), which, given secure point-to-point channels between parties, and a broadcast channel among all parties, operates based on Shamir's linear secret sharing scheme described above, and has $O(Cn)k+O(Dn^2)k+poly(k)$ communication complexity, where C and D are the size and the multiplication depth of arithmetic circuit, respectively. The DN-MPC protocol was selected because its communication and computation requirements are linear in the circuit size and number of parties, so it has the potential to scale well for a large number of parties DN-MPC is statistically secure tolerating less than t=n/3 corruptions among n parties. The DN-MPC is proven secure in the framework of universal composability (UC), introduced in Literature Reference No. 4. Described below is a list of five fundamental protocols built on from the DN-MPC protocol (for more details, see Literature Reference No. 6).

1. Rand: When executed, parties obtain l instances of t-sharing [r], r is uniformly distributed over the field $\mathbb{F}$.
2. DoubleRand: When executed, parties obtain l pairs of shares [r] and $\langle R \rangle$ such that r is uniform over the field $\mathbb{F}$ and r=R. Call these shares double random shares.
3. MultTriple: This multiplication triple protocol enables parties to compute l triples of [a], [b], and [c] such that a and b are uniform over the field $\mathbb{F}$ and satisfy a·b=c (implementation leverages DoubleRand).
4. Mult([a], [b]): Parties initially hold two shares [a] and [b]. Upon execution of this protocol, parties obtain a share [c] such that c=a·b (implementation leverages an earlier execution of MultTriple).
5. Open([s]): Parties initially hold a share [s]. If the parties publicly open [s], then all the parties obtain s from the execution. If the parties open [s] towards party $P_i$, then only $P_i$ obtains s as its output and all other parties output ⊥.

Note that additions of two shares and any algebraic operations between a scalar and a share can be locally performed due to the linearity of the underlying secret sharing scheme. That is, [a]+[b]=[a+b], a+[b]=[a+b], and a[b]=[ab]. The first three protocols above are protocols for pre-processing, the outputs of which are used as resources for secure evaluation of arithmetic circuits. In the following descriptions of algorithms, slightly abuse the notation of random shares as follows: Nodes computes [r]←Rand(•) means that nodes take [r] from the list of preprocessed random shares, generated by executing Rand(l). This notational abuse also applied to other preprocessing data such as double random sharings and multiplication triples.

(3.2.3) RandBit

This is an auxiliary MPC protocol due to Toft (see Literature Reference No. 13) used as a building block for the other protocols. The protocol RandBit below allows the servers to compute a secret sharing of a random bit (either 0 or 1), such that no server knows the value of the bit.

Inputs: None
Outputs: All nodes output their share [b] of a uniformly chosen bit b.
1. All $P_i$'s jointly compute $[r] \leftarrow \text{Rand}(\cdot)$.
2. All $P_i$'s jointly compute $[r^2] \leftarrow \text{Mult}([r], [r])$.
3. All $P_i$'s publicly obtain $r^2 \leftarrow \text{Open}([r^2])$.
4. Except with exponentially small probability, there exist $r_1, r_2 \in \mathbb{N}$ such that $$0 < r_1 < \frac{p-1}{2} < r_2 < p$$

and $r^2 \equiv r_1^2 \equiv r_2^2 \mod p$. ($r_1$ and $r_2$ can be thought of as r and −r mod p). All parties set $r' = r_1$.
5. Each party locally computes $[b] \leftarrow 2^{-1}([r](r')^{-1} + 1)$.

(3.3) MPC Protocols (Circuits)
(3.3.1) GenCoin

This is a simple auxiliary protocol used as a building block for the other protocols. The protocol GenCoin below allows the servers to compute a sharing of a random integer between 0 and n−1 (inclusive) such that no server knows the shared integer. Unlike the protocols that follow, this protocol is fairly obvious given Literature Reference No. 7.

Inputs: A number n, an upper-bound for the sampling domain, where n is a power of two.
Output: All nodes output their share [r] of a number r such that r is distributed uniformly at random in {1, 2, ..., n}.
1. All $P_i$'s jointly execute m=log n invocations of RandBit ($\cdot$) to obtain $[b_a]$).
2. All $P_i$'s locally compute $[r] = 1 + \sum_{i=1}^{m-1} [b_i] 2^i$.

(3.3.2) Convert

The protocol Convert below allows the servers to compute a unary vector representing a secret value from a binary vector representing the same secret value. This is an auxiliary protocol that is used as a building block in other protocols.

Inputs: Shared binary representation $[b_0], [b_1], \ldots, [b_{m-1}]$ of node identifier i such that $i = 1 + \sum_{k=1}^{m-1} [b_k] 2^k$.
Outputs: A shared unary allocation vector $\langle [a_1], [a_2], \ldots, [a_n] \rangle$ such that $[a_i] = [1]$ and $[a_j] = [0]$ for all j
1. For each $i \in \{1, \ldots, n\}$, all nodes jointly compute $[a_i] = (\Pi_{j \in I_i}[b_j])(\Pi_{j \notin I_i}(1-[b_j]))$, where $I_i \in \{0, \ldots, m-1\}$ is the set of indices of non-zero $b_j$ in the binary representation of i.
2. All nodes output a vector $\langle [a_1], [a_2], \ldots, [a_n] \rangle$.

(3.3.3) Information-Theoretic Message Authentication Code (MAC)

To enable a client to verify validity and authenticity of messages sent from a compute (or service) node, the parties can use a simple and efficient MAC. Let x be a message, defined as an element of the field F, that a compute node needs to send to a client. Suppose that a and b, where a and b are uniformly distributed in field F, are agreed upon and held by both client and the computing node. The MAC for message x is defined to be y=a*x+b. When the node sends its message x to client, it also sends y. Upon receiving (x;y), the client checks if y=a*x+b, and if the check succeeds, then the client accepts the message x. Note that nodes that do not possess a and b will fail to generate the correct MAC for a message x, with respect to a and b, except with probability 1=|F|.

While MACs are useful for checking validity and authenticity when the job is assigned to a single node, they are not needed when the job is assigned to multiple nodes, because the majority voting process confirms validity and authenticity. Thus, MACs is an optional feature.

(3.3.4) SecureJobSubmission

The protocol SecureJobSubmission below allows a client to submit a job to the collection of servers. This is the initial protocol that starts the execution of the job; it implements the "Job Submission" block of the data flow diagram. In this protocol, the client distributes shares of a secret key to the servers that will allow the assigned server(s) to decrypt the job data.

Inputs: The client has a private input (data) describing a compute job.
Outputs: All nodes obtain their share [sk] of decryption key sk, and a ciphertext $\text{Enc}_{sk}(\text{data})$.
1. The client samples a secret key sk.
2. The client computes a ciphertext $\xi$ by computing $\text{Enc}_{sk}$(data).
3. The client computes t-sharing [sk] of sk.
4. The client broadcasts $\xi$ to the servers and sends each share [sk] to a server node.

(3.3.5) RandJobAlloc

The following RandJobAlloc protocol allows the servers to allocate a job submitted in the protocol SecureJobSubmission to one of the servers without any of the servers knowing which server was assigned the job. The assigned server will receive the secret key submitted by the client, which will allow the server to decrypt the data.

This protocol is one of two alternative implementations of the "Job Assignment and Replication" block of the data flow diagram. It implements the job assignment functionality, but not the replication functionality. One would use it in those situations where replication is not needed. Alternatively, this protocol can be used as a building block of the RedundantRandJobAlloc protocol below.

Inputs: A share [sk] of decryption key sk for a job of identifier σ received from a client.
Outputs: Node $P_i$ obtains decryption key sk if and only if $P_i$ is allocated to job σ.
1. All parties execute $[\tau] \leftarrow \text{GenCoin}_n(\cdot)$.
2. All parties execute $([a], [b]) \leftarrow \text{Rand}(\cdot)$.
3. All parties send their shares [a] and [b] to the client.
4. For each i such that $1 \leq i \leq n$, all parties compute the following:
   a. $[r_i] \leftarrow \text{Rand}(\cdot)$,
   b. $[r_i'] \leftarrow \text{Rand}(\cdot)$, and
   c. $\text{Rand}(\cdot)$.
5. For each i such that $1 < i < n$, all parties compute the following using Mult($\cdot$,$\cdot$) and local computation:
   a. $[\alpha_i] \leftarrow ([r_i]([\tau]-i)) + [sk]$.
   b. $[\beta_i] \leftarrow ([r_i]([\tau]-i)) + [a]$.
   c. $[\gamma_i] \leftarrow ([r_i''][\tau]-i)) + [b]$.
6. For each i such that $1 \leq i \leq n$, all parties execute Open $([\alpha_i])$, Open$([\beta_i])$, and Open$([\gamma_i])$ towards $P_i$.
7. For each i such that $1 \leq i \leq n$, all parties compute Convert ($\cdot$) on the shares of the binary representation of τ and update the resulting assignment vector to their state.
8. The client outputs the MAC key (a,b) by reconstructing (a,b) using the Berlekamp-Welch algorithm.
9. Each party $P_i$ outputs recovered values $\alpha_i$, $\beta_i$, and $\gamma_i$.

Note that in step 9, the party that has the job assigned would get sk, a, and b, while all other parties would get a random value (that is, noise). The party that has the job assigned would know it got the assignment by seeing that the values it got is a well-formed sk/a/b triple.

(3.3.6) RedundantRandJobAlloc

The protocol RedundantRandJobAlloc below is similar to the protocol RandJobAlloc above; the only difference is that it submits the job to multiple servers instead of a single one, using RandJobAlloc as a subprotocol. This protocol is the main of the two alternative implementations of the "Job Assignment and Replication" block of the data flow diagram.

Inputs: Desired multiplicity $\mu$ and a share of decryption key [sk] for a job of identifier $\sigma$ received from a client.

Outputs: At most $2\mu-1$ nodes assigned to the job output decryption key sk.

1. Let $\mu < n/4$.
2. All parties jointly execute the RandJobAlloc protocol independently $2\mu-1$ times.
3. All parties output the results computed by the above step.

(3.3.7) SingleJobDelivery

The protocol SingleJobDelivery below returns the completed job data to the client and allows the client to confirm that the data has come from the server that was assigned the job. This protocol implements the "Robust Result Checking" block of the data flow diagram for those alternatives that utilize the RandJobAlloc protocol for the "Job Assignment and Replication" block of the data flow diagram.

Input of node P assigned job: A result m and a MAC key (a,b) (obtained during the job allocation if assigned).

Inputs of client: A MAC key (a', b') (obtained during the job allocation).

Outputs: The client outputs m sent from node P.

1. Let party P be the node assigned to a job requested by client C such that the result is m.
2. Party P selects a field element x uniformly at random and computes y=ax+b.
3. Party P sends (m,x,y) to client C.
4. Optionally—all other parties sent a random message of the same size to the client (used if it is desired that the network traffic generated by the assignee node should be indistinguishable from the network traffic generated by all other nodes).
5. Upon the reception of (m,x,y) from P, client C using its own (a', b') and checks if y=a'x+b'. 6. If the check succeeds, then C accepts and outputs m as the result of computation.
7. Otherwise, it outputs $\perp$.

(3.3.8) RedundantJobDelivery

The protocol RedundantJobDelivery below is similar to the protocol SingleJobDelivery; the difference is that RedundantJobDelivery is used in the case that the job was processed by multiple servers (instead of just one in the case of SingleJobDelivery). The protocol RedundantJobDelivery implements a voting algorithm to allow the servers to decide on the correct value of the job to be returned to the client. This protocol implements the "Robust Result Checking" block of the data flow diagram for those alternatives that utilize the RedundantRandJobAlloc protocol for the "Job Assignment and Replication" block of the data flow diagram.

When a job is assigned to multiple nodes, it is desirable for CloudCOP nodes to internally (but in a secure and anonymous way) compute the majority of their outputs. In the following, it is assumed that a client submits a job to the cloud as a redundant job assignment with value m so that there exist at least m nodes assigned to the job with high probability. The value for m can be greater than or equal to one. For example, the COP node may choose to use m=1 most of the time, and m=2 on unpredictable, but rare, occasions in order to catch potential cheaters. The desired properties for anonymous majority voting are:

(1) the value selected as a majority remains hidden from the corrupted parties unless a corrupted party was assigned to the job; and
(2) the identities of nodes assigned to the job remain hidden from the corrupted parties.

As an added layer of security, the nodes that are assigned the job can encrypt the hash before sharing it using the same key that was provided by the client to encrypt the initial job data. In the following description, denote the set of nodes assigned to the job by Assigned and the set of the other nodes by $\overline{\text{Assigned}}$.

Private inputs of each node $P_i$:

A result $y_i$ and l status vectors $[b_1^j], [b_2^j], \ldots, [b_n^j]$ for $1 \leq j \leq l = 2\mu-1$, corresponding to a job of identifier $\sigma$. The status vectors are a result of the previous execution of Convert performed in step 7 of the RedundantRandJobAlloc. That, is for every j, there is some i that $[b_i^j]$ are the shares of 1, and $[b_{i'}^j]$ for all i'≠i are the shares of 0.

Outputs:

The clients learns the majority result y.

1. Voting Phase:
   a. Each $P_i \in$ Assigned secret-shares hash($y_i$).
   b. Each $P_i \in \overline{\text{Assigned}}$ secret-shares 0.
   c. Each $P_i$ computes $[v_i^j]=[b_1^j] \cdot [\text{hash}(y_i)]$ for all $1 \leq i \leq n$ and $1 \leq j \leq l$, where [ ] is a notation for shares of a secret, v is an intermediate value, b is the input, and hash($y_i$) represents what was shared in steps 1a and 1b. n is the number of parties (i.e., COP nodes) to the MPC protocol.
   d. Each $P_i$ computes $[c^j]=\Sigma_{i=1}^n [v_i^j]$ for all j, where j is the index of the job replica. $c^j$ is an intermediate value. For $P_i \in$ Assigned, $c^j$ will be the same value as the one it secret-shared in step 1a. (That is, hash($y_i$), unless $P_i$ is malicious and chose to secret share something else). For $P_i$ not in Assigned, $c^j$ is 0 even if $P_i$ is malicious and violated the protocol by secret sharing something other than 0 in step 1b (this is because the corresponding b is 0 for non-assigned nodes).
   e. Each $P_i$ broadcasts $[c^j]$ for all j.

2. Majority Decision Phase:
   a. Each $P_i$ recovers $c^j$ for all j. Note that $[c^j]$ is a share. When nodes have $[c^j]$, each has one share and does not know the value of $c^j$. When a node (or client) has all $[c^j]$, then $c^j$ can be determined.
   b. Each $P_i$ computes c which appears most frequently among $c^j$ values.
   c. Each $P_i$ sends c to the client. The client is any computer system (including a mobile device (e.g., mobile phone) submitting a job to the cloud.
   d. Each $P_i \in$ Assigned sends $y_i$ to the client.
   e. Each $P_i \in \overline{\text{Assigned}}$ sends 0 to the client (optional; only needed if it is desired that the network traffic from Assigned nodes be indistinguishable from the network traffic from the $\overline{\text{Assigned}}$ ones).
   f. The client determines y by siding with the majority and takes as output any $y_i$ that satisfies hash($y_i$)=c.

Figure 4:
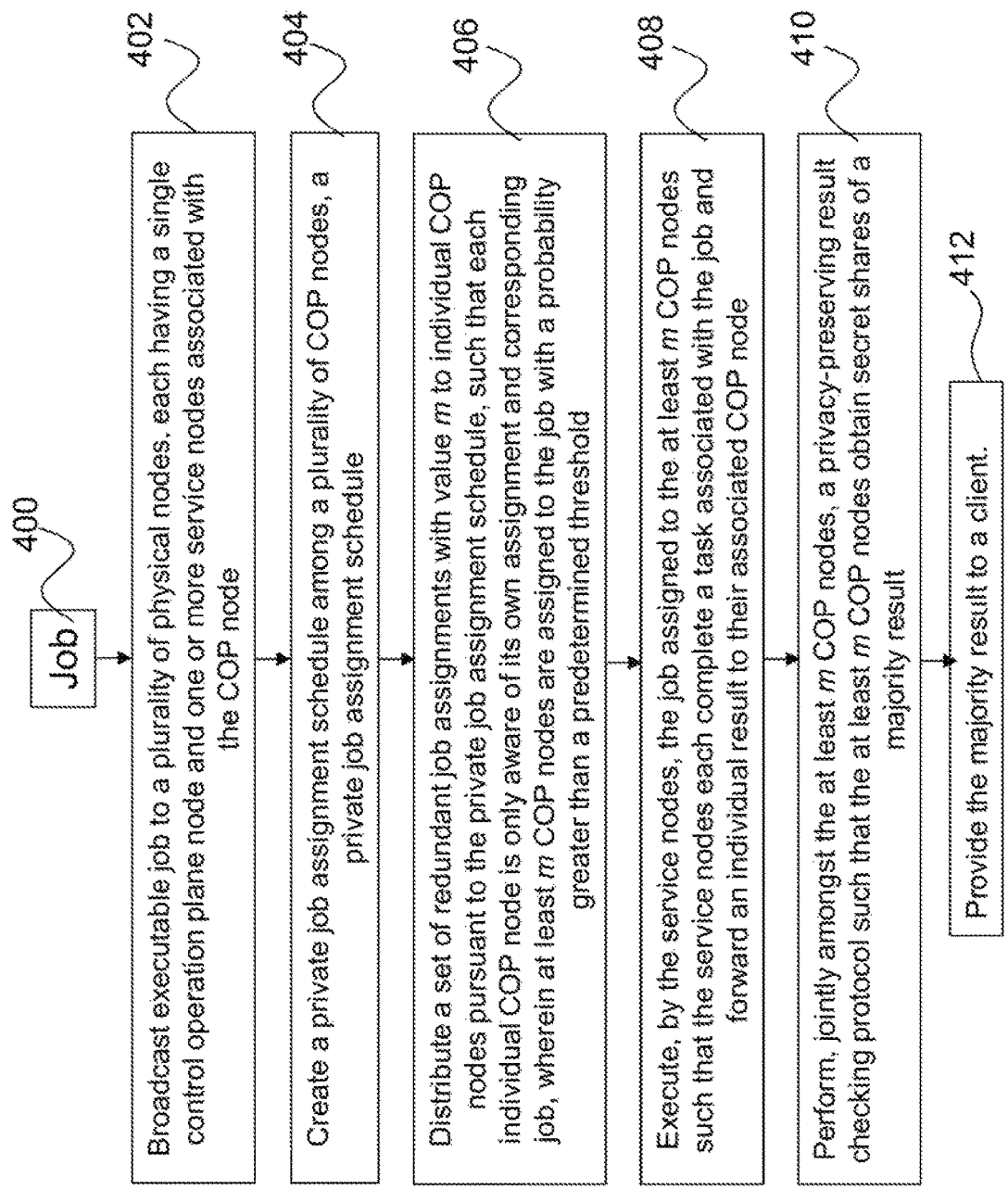
FIG. 4 is a flow diagram illustration operations of a security system according to some embodiments of the present disclosure.

FIG. 4 is a flow diagram depicting the operations performed for the system described herein. Given an executable job (element 400), in a first operation (element 402), the system broadcasts the job to a set of physical nodes, each of the physical nodes having a single control operations plane (COP) node and one or more service nodes associated with the COP node. In a second operation (element 404), a private job assignment schedules is created jointly amongst COP nodes. In a third operation (element 406), a set of redundant job assignments with value m is distributed to individual COP nodes pursuant to the private job assignment schedule, such that each individual COP node is only aware of its own assignment and corresponding job, wherein at least m COP nodes are assigned to the job with a probability greater than a predetermined threshold. Common examples of a threshold include "less than n/3 nodes" and "less that n/4" nodes, where n is the total number of nodes participating in the MPC protocol. In a fourth operation (element 408), the job assigned to them COP nodes is executed by the service nodes such that the service nodes each complete a task associated with the job and forward an individual result to their associated COP node. In a fifth operation (element 410), a privacy-preserving result checking protocol is performed jointly amongst the at least m COP nodes, such that the at least m COP nodes obtain secret shares of a majority result. The majority result (element 412) is then provided to a client.

The present invention can be used for a wide number of applications. For instance, the system and method described herein can be used to allow distributed vehicles/aircraft to submit jobs to distributed servers in a secure manner. A non-limiting example of a job to be distributed by a vehicle is a request to help the vehicle find an optimal route to its destination, where the output is a final optimal route. The system can then cause the vehicle to automatically maneuver along the final optimal route by causing vehicle operations, such as steering, accelerating, slowing down, and stopping of the vehicle via multiple vehicle mechanical components (e.g., braking mechanism, steering mechanism, engine, acceleration mechanism).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for anonymous job allocation and majority voting in a cloud computing environment, the system comprising:
   one or more processors and a non-transitory memory having instructions encoded thereon such that when the instructions are executed, the one or more processors perform operations of:
      broadcasting an executable job to a plurality of physical nodes, each of the physical nodes having a single control operations plane (COP) node and one or more service nodes associated with the COP node;
      creating, jointly amongst a plurality of COP nodes, a private job assignment schedule;
      distributing a set of redundant job assignments with value m to individual COP nodes pursuant to the private job assignment schedule, such that each individual COP node is only aware of its own assignment and corresponding job, wherein at least m COP nodes are assigned to the job with a probability greater than a predetermined threshold;
      executing, by the service nodes, the job assigned to the at least m COP nodes such that the service nodes each complete a task associated with the job a forward an individual result $y_i$ to their associated COP node;
      performing, jointly amongst the at least m COP nodes, a privacy-preserving result checking protocol such that the at least m COP nodes obtain secret shares of a majority result,
      where in performing the result checking protocol, a voting algorithm for determining the majority value is implemented, wherein the voting algorithm comprises a voting phase,
      wherein during the voting phase,
         each node assigned to the job secretly shares [hash$(y_i)$];
         each node not assigned the job shares nothing;
         each node computes $[v_i^j]=[b_i^j] \cdot [\text{hash}(y_i)]$, where [ ] is a notation for shares of a secret, v is an intermediate value, and b is an input;
         each node computes $[c^j]=\Sigma_{i=1}^{n}[v_i^j]$; and
         each $P_i$ broadcasts $[c^j]$ for all j,
      wherein the majority result is the individual result $y_i$ obtained by a determined majority of the service nodes; and
   providing the majority result to a client.

2. The system as set forth in claim 1, wherein a value representing the determined majority of the service nodes is hidden from any corrupted nodes unless a corrupted node is assigned to the job.

3. The system as set forth in claim 2, wherein the voting algorithm further comprises a majority decision phase.

4. The system as set forth in claim 3, wherein during the majority decision phase,
   each node recovers $c^j$ for all j;
   each node computes c which appears most frequently among $c^j$ values;
   each node sends c to the client;
   each node assigned to the job sends $y_i$ to the client; and
   each node not assigned to the job sends nothing to the client.

5. The system as set forth in claim 4, wherein any $y_i$ that satisfies hash$(y_i)$=c is provided as the majority result to the client.

6. A computer implemented method for anonymous job allocation and majority voting in a cloud computing environment, the method comprising an act of:
   causing one or more processors to execute instructions encoded on a non-transitory computer-readable medium, such that upon execution, the one or more processors perform operations of:
   broadcasting an executable job to a plurality of physical nodes, each of the physical nodes having a single control operations plane (COP) node and one or more service nodes associated with the COP node;
   creating, jointly amongst a plurality of COP nodes, a private job assignment schedule;
   distributing a set of redundant job assignments with value m to individual COP nodes pursuant to the private job assignment schedule, such that each individual COP node is only aware of its own assignment and corresponding job, wherein at least m COP nodes are assigned to the job with a probability greater than a predetermined threshold;
   executing, by the service nodes, the job assigned to the at least m COP nodes such that the service nodes each complete a task associated with the job and forward an individual result $y_i$ to their associated COP node;

performing, jointly amongst the at least m COP nodes, a privacy-preserving result checking protocol such that the at least m COP nodes obtain secret shares of a majority result, where in performing the result checking protocol, a voting algorithm for determining the majority value is implemented, wherein the voting algorithm comprises a voting phase, wherein during the voting phase,
  each node assigned to the job secretly shares $[hash(y_i)]$;
  each node not assigned the job shares nothing;
  each node computes $[v_i^j]=[b_i^j] \cdot [hash(y_i)]$, where [ ] is a notation for shares of a secret, v is an intermediate value, and b is an input;
  each node computes $[c^j]=\Sigma_{i=1}^n [v_i^j]$; and
  each $P_i$ broadcasts $[c^j]$ for all j,
  wherein the majority result is the individual result $y_i$ obtained by a determined majority of the service nodes; and providing the majority result to a client.

7. The method as set forth in claim 6, wherein a value representing the determined majority of the service nodes is hidden from any corrupted nodes unless a corrupted node is assigned to the job.

8. The method as set forth in claim 7, wherein the voting algorithm further comprises a majority decision phase.

9. The method as set forth in claim 8, wherein during the majority decision phase,
  each node recovers $c^j$ for all j;
  each node computes c which appears most frequently among $c^j$ values;
  each node sends c to the client;
  each node assigned to the job sends $y_i$ to the client; and
  each node not assigned to the job sends nothing to the client.

10. The method as set forth in claim 9, wherein any $y_i$ that satisfies $hash(y_i)=c$ is provided as the majority result to the client.

11. A computer program product for anonymous job allocation and majority voting in a cloud computing environment, the computer program product comprising:
  computer-readable instructions stored on a non-transitory computer-readable medium that are executable by a computer having one or more processors for causing the processor to perform operations of:
  broadcasting an executable job to a plurality of physical nodes, each of the physical nodes having a single control operations plane (COP) node and one or more service nodes associated with the COP node;
  creating, jointly amongst a plurality of COP nodes, a private job assignment schedule;
  distributing a set of redundant job assignments with value m to individual COP nodes pursuant to the private job assignment schedule, such that each individual COP node is only aware of its own assignment and corresponding job, wherein at least m COP nodes are assigned to the job with a probability greater than a predetermined threshold;
  executing, by the service nodes, the job assigned to the at least m COP nodes such that the service nodes each complete a task associated with the job a forward an individual result $y_i$ to their associated COP node;
  performing, jointly amongst the at least m COP nodes, a privacy-preserving result checking protocol such that the at least m COP nodes obtain secret shares of a majority result, where in performing the result checking protocol, a voting algorithm for determining the majority value is implemented, wherein the voting algorithm comprises a voting phase, wherein during the voting phase,
  each node assigned to the job secretly shares $[hash(y_i)]$;
  each node not assigned the job shares nothing;
  each node computes $[v_i^j]=[b_i^j] \cdot [hash(y_i)]$, where [ ] is a notation for shares of a secret, v is an intermediate value, and b is an input;
  each node computes $[c^j]=\Sigma_{i=1}^n [v_i^j]$; and
  each $P_i$ broadcasts $[c^j]$ for all j,
  wherein the majority result is the individual result $y_i$ obtained by a determined majority of the service nodes; and providing the majority result to a client.

12. The computer program product as set forth in claim 11, wherein a value representing the determined majority of the service nodes is hidden from any corrupted nodes unless a corrupted node is assigned to the job.

13. The computer program product as set forth in claim 12, wherein the voting algorithm further comprises a majority decision phase.

14. The computer program product as set forth in claim 13, wherein during the majority decision phase,
  each node recovers $c^j$ for all j;
  each node computes c which appears most frequently among $c^j$ values;
  each node sends c to the client;
  each node assigned to the job sends $y_i$ to the client; and
  each node not assigned to the job sends nothing to the client.

15. The computer program product as set forth in claim 14, wherein any $y_i$ that satisfies $hash(y_i)=c$ is provided as the majority result to the client.

16. The system as set forth in claim 1, wherein the client is a vehicle, and wherein the majority result is an optimal route to a destination for the vehicle.

17. The system as set forth in claim 16, wherein the one or more processors further perform an operation of causing the vehicle to maneuver along the optimal route.

* * * * *